(12) United States Patent
VanBerlo

(10) Patent No.: US 6,832,681 B2
(45) Date of Patent: Dec. 21, 2004

(54) TOBACCO LEAF ELEVATOR

(76) Inventor: Peter VanBerlo, R.R. #4, Simcoe, Ontario (CA), N3Y 4K3

( * ) Notice: Subject to any disclaimer, the term of this patent is extended or adjusted under 35 U.S.C. 154(b) by 66 days.

(21) Appl. No.: 10/236,989

(22) Filed: Sep. 9, 2002

(65) Prior Publication Data

US 2004/0050662 A1 Mar. 18, 2004

(30) Foreign Application Priority Data

Aug. 29, 2002 (CA) .......................................... 2400145

(51) Int. Cl.$^7$ ............................................... B65G 21/10
(52) U.S. Cl. ....................... 198/536; 198/560; 198/622; 198/455; 198/598
(58) Field of Search ................................ 198/560, 536, 198/622, 454, 455, 598

(56) References Cited

U.S. PATENT DOCUMENTS

| | | | |
|---|---|---|---|
| 2,810,467 A | * 10/1957 | Bogaty | ........................ 198/57 |
| 2,873,747 A | 2/1959 | Schlossmacher | |
| 3,772,862 A | 11/1973 | Wilson | |
| 3,885,376 A | 5/1975 | Johnson | |
| 4,018,674 A | 4/1977 | Morris | |
| 4,026,431 A | 5/1977 | Long | |
| 4,047,365 A | 9/1977 | Suggs | |
| 4,178,745 A | 12/1979 | Wilson | |
| 4,379,669 A | 4/1983 | Wilson | |
| 4,520,579 A | 6/1985 | De Cloet et al. | |
| 4,530,203 A | 7/1985 | De Cloet | |
| 6,321,758 B1 | 11/2001 | Sturgill et al. | |

* cited by examiner

Primary Examiner—Joe Dillon, Jr.

(57) ABSTRACT

The invention provides an elevator for separating and distributing a plurality of whole freshly harvested tobacco leaves including clumps of agglomerated tobacco leaves. The elevator has an inclined frame longitudinally extending between a lower end and an upper end, an endless conveyor, and a declumper. The frame carries deck portions extending substantially between the lower end and the upper end. The conveyor is adapted to travel over the deck portions in an upward direction and under the deck portions in a downward direction. The conveyor is also adapted to carry the tobacco leaves to the upper end and discharge the tobacco leaves from the upper end. Also, the elevator includes a declumper adapted to buffet the clumps of tobacco leaves to separate the whole tobacco leaves in the clumps from each other.

16 Claims, 12 Drawing Sheets

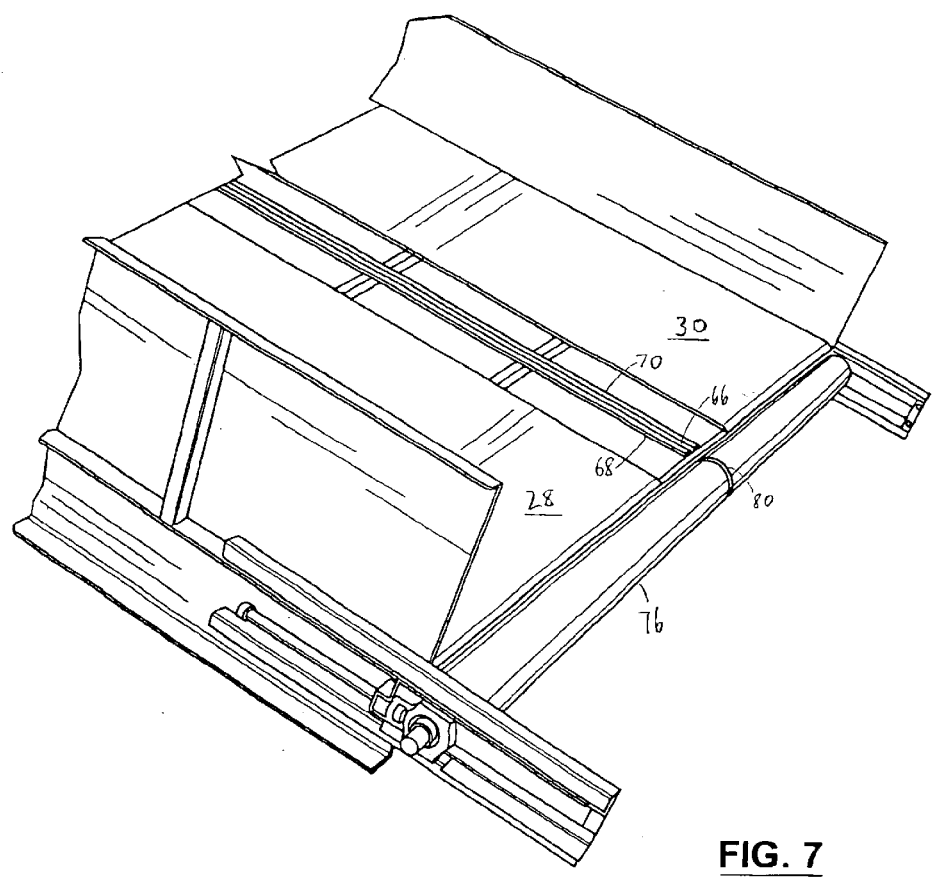
FIG. 7
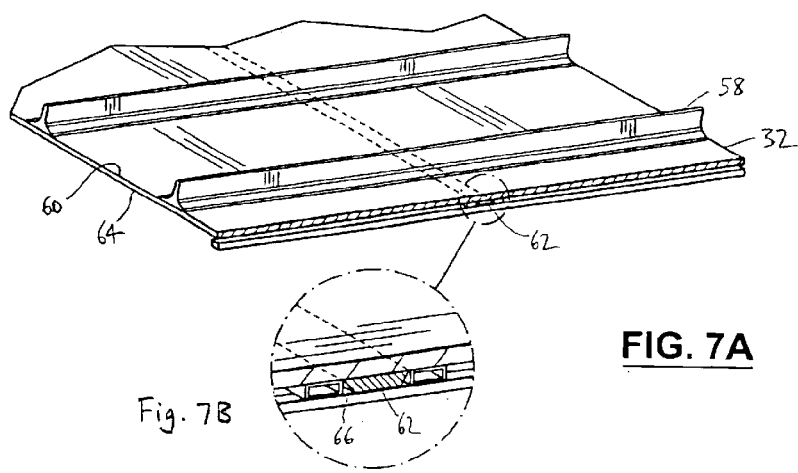
FIG. 7A
Fig. 7B

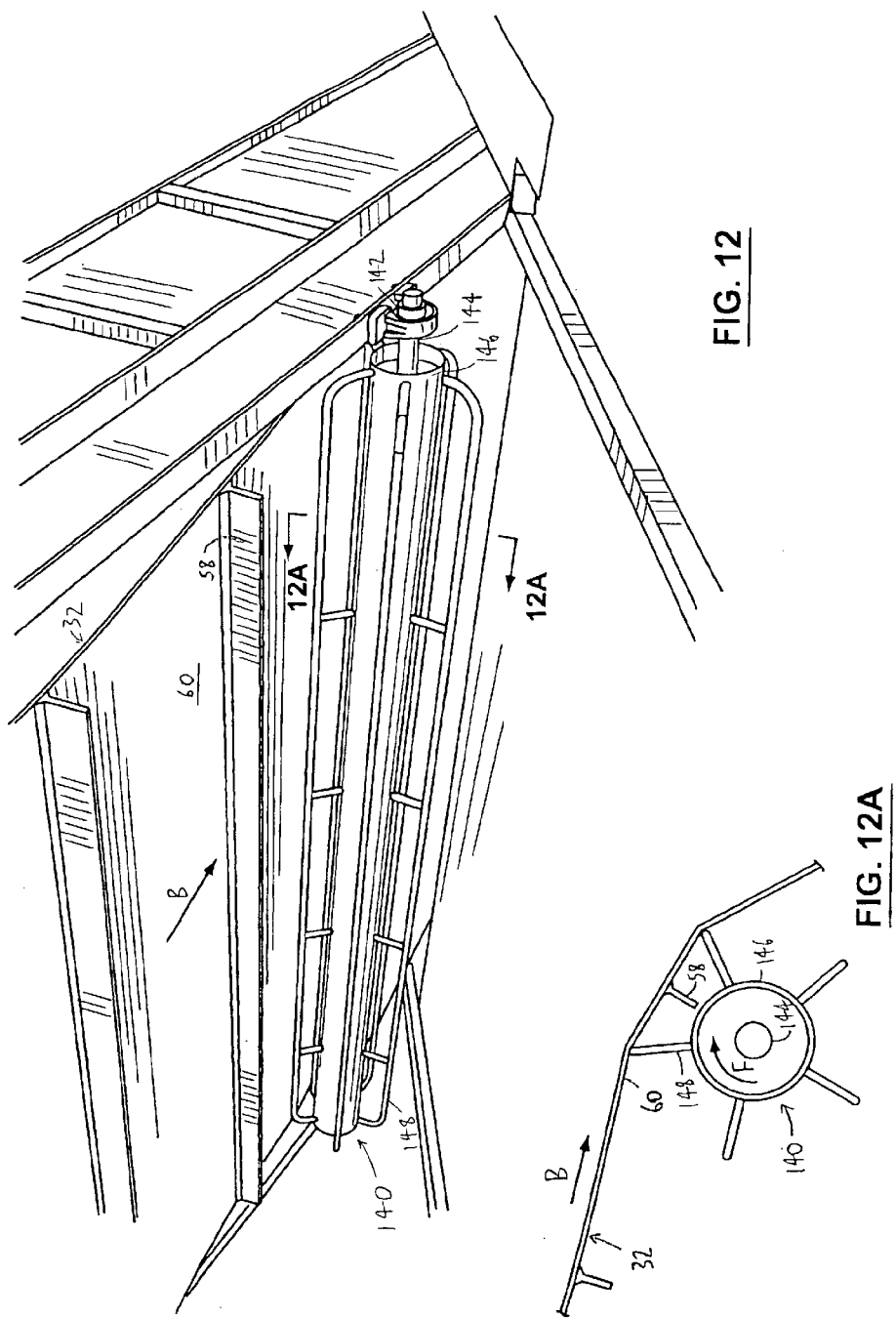

TOBACCO LEAF ELEVATOR

FIELD OF THE INVENTION

This invention relates to elevators and, more particularly, elevators for separating and distributing whole freshly-harvested tobacco leaves.

BACKGROUND OF THE INVENTION

Tobacco leaves are usually harvested using tobacco harvesting machines, or combines. Typically, the whole freshly-harvested tobacco leaves are transported in a container from the harvesting machine in the field to a transfer facility where the tobacco leaves are transferred to tobacco curing bins. The tobacco curing bins are subsequently placed in curing barns, where the tobacco leaves are bulk cured. A typical tobacco curing bin is disclosed in U.S. Pat. No. 4,520,579 (De Cloet et al.).

The whole tobacco leaves should be open and flat when they are placed in the tobacco curing bin. In particular, the surfaces of the tobacco leaves should generally be parallel, and the leaves should be uniformly distributed in the curing bin. This uniform distribution permits effective bulk curing of the tobacco leaves. If the tobacco leaves are uniformly packed in the curing bin, then the heating and conditioned air which is forced between the leaves during bulk curing in the curing barn will flow uniformly through the curing bin. However, if the tobacco leaves are not uniformly packed in the curing bin, and voids remain between tobacco leaves, then the heated and conditioned air will tend to flow through the voids. The result of the heated and conditioned air flowing through voids is that some of the tobacco leaves will not be exposed to the heated and conditioned air to the extent necessary for proper curing.

Immediately after harvesting by a harvesting machine, the tobacco leaves typically are placed in a receptacle on a machine in a disordered and non-uniform mass. Also, leaves at the bottom of the receptacle on the harvesting machine tend to become compacted into clumps due to the weight of tobacco leaves pressing on the leaves at the bottom. In addition, the moisture content of the leaves fluctuates, largely depending on conditions at harvesting. The tobacco leaves which have higher moisture content have a greater tendency to agglomerate into clumps.

As noted above, it is desirable that the tobacco leaves are distributed substantially uniformly in the curing bin, with the tobacco leaves open and substantially parallel to each other. However, the result of mechanical harvesting is to provide a disordered and non-uniform mass of tobacco leaves in the receptacle at the harvesting machine, some of which may be agglomerated into clumps. The tobacco farmer therefore is confronted with the problem of how to achieve a substantially uniform distribution of leaves in the tobacco curing bin when the tobacco leaves are provided in the receptacle of the harvesting machine in a disordered and non-uniform mass. Also, traditional separation and distribution methods have often relied at least partly on manual labour, but tobacco farmers are required to use machines as much as possible due to increases in labour costs over the long term.

Various devices are known which are intended to result in a uniform distribution of tobacco leaves in the tobacco curing bin. For example, in U.S. Pat. No. 6,321,758 B1 (Sturgill et al.), a tobacco transferring system is disclosed in which, after the tobacco leaves have been transported in crates to a transfer facility, the tobacco leaves are subsequently dumped onto conveyors. The conveyors, which are arranged in pairs in series (i.e. end to end) and operated at different speeds, move the tobacco leaves to curing bins.

U.S. Pat. No. 4,530,203 (De Cloet) discloses a tobacco harvester discharge system which is intended to be positioned on the tobacco harvesting machine, to put the tobacco leaves in a curing bin positioned on the harvesting machine. Harvested tobacco leaves are sent through rolls positioned at the end of a conveyor, which launch the leaves into an airborne trajectory into the curing bin. After the leaves have been launched, they are supported by air blown upwardly from a fan positioned underneath the leaves, so that the tobacco leaves will float along a predetermined trajectory into the curing bin.

For various reasons, the known devices for distributing whole freshly-harvested tobacco leaves in tobacco curing bins are deficient. There is therefore a need for a conveyor for separating and distributing whole freshly-harvested tobacco leaves.

SUMMARY OF THE INVENTION

In abroad aspect of the present invention, there is provided an elevator for separating and distributing a load of whole freshly harvested tobacco leaves. The load includes a number of clumps of agglomerated tobacco leaves. The elevator has an inclined frame extending between a lower end and an upper end, an endless conveyor, and a declumper. Also, the frame carries deck portions extending substantially between the lower end and the upper end, and the conveyor is adapted to travel over the deck portions in an upward direction and under the deck portions in a downward direction. The endless conveyor is also adapted to carry the tobacco leaves to the upper end and discharge the tobacco leaves therefrom. In addition, the declumper is attached to the frame and positioned above the conveyor, and is adapted to buffet the clumps of tobacco leaves to separate the whole tobacco leaves in the clumps from each other. The declumper includes a rotatable declumper axle positioned transversely to the conveyor and nose elements projecting radially outwardly from the declumper axle. Each nose element includes a blunt end distal to the declumper axle and adapted to push the tobacco leaves apart without puncturing the tobacco leaves. Accordingly, the conveyor is adapted to elevate the load to the upper end so that the elevated load may fall from the upper end and the tobacco leaves may separate from each other.

In another aspect of the present invention, the elevator includes the inclined frame, the endless conveyor, and a distribution mechanism. The distribution mechanism is adapted to distribute the discharged tobacco leaves in a tobacco curing bin positioned substantially underneath the upper end of the frame. The distribution mechanism includes a main panel having a top end and a bottom end, and the top end is coupled to the frame by a hinge spaced a distance from the upper end of the frame which is selected to permit the discharged tobacco leaves to fall a predetermined distance between the frame and the panel, to maximize separation of the tobacco leaves from each other. In addition, the main panel is adapted to oscillate on the hinge relative to the frame, for distributing the tobacco leaves uniformly in the bin to optimize curing. As a result, the tobacco leaves discharged from the upper end of the frame are distributed evenly across the bin.

BRIEF DESCRIPTION OF THE DRAWINGS

The invention will be better understood with reference to the drawings, in which:

FIG. 7 is an isometric view of the frame showing a channel and two deck portions positioned on opposite sides of the channel, drawn at a larger scale;

FIG. 7A is an isometric view of the conveyor and the frame and a partial cross-section of the conveyor showing a ridge included in the conveyor received in the channel;

FIG. 7B is an isometric view of the ridge received in the channel, drawn at a larger scale;

FIG. 12 is an isometric view of the elevator showing a roller positioned underneath the endless conveyor, drawn at a larger scale; and FIG. 12A is a partial cross-section of the roller and the conveyor, drawn at a larger scale.

DETAILED DESCRIPTION OF THE PREFERRED EMBODIMENT(S)

Figure 1:
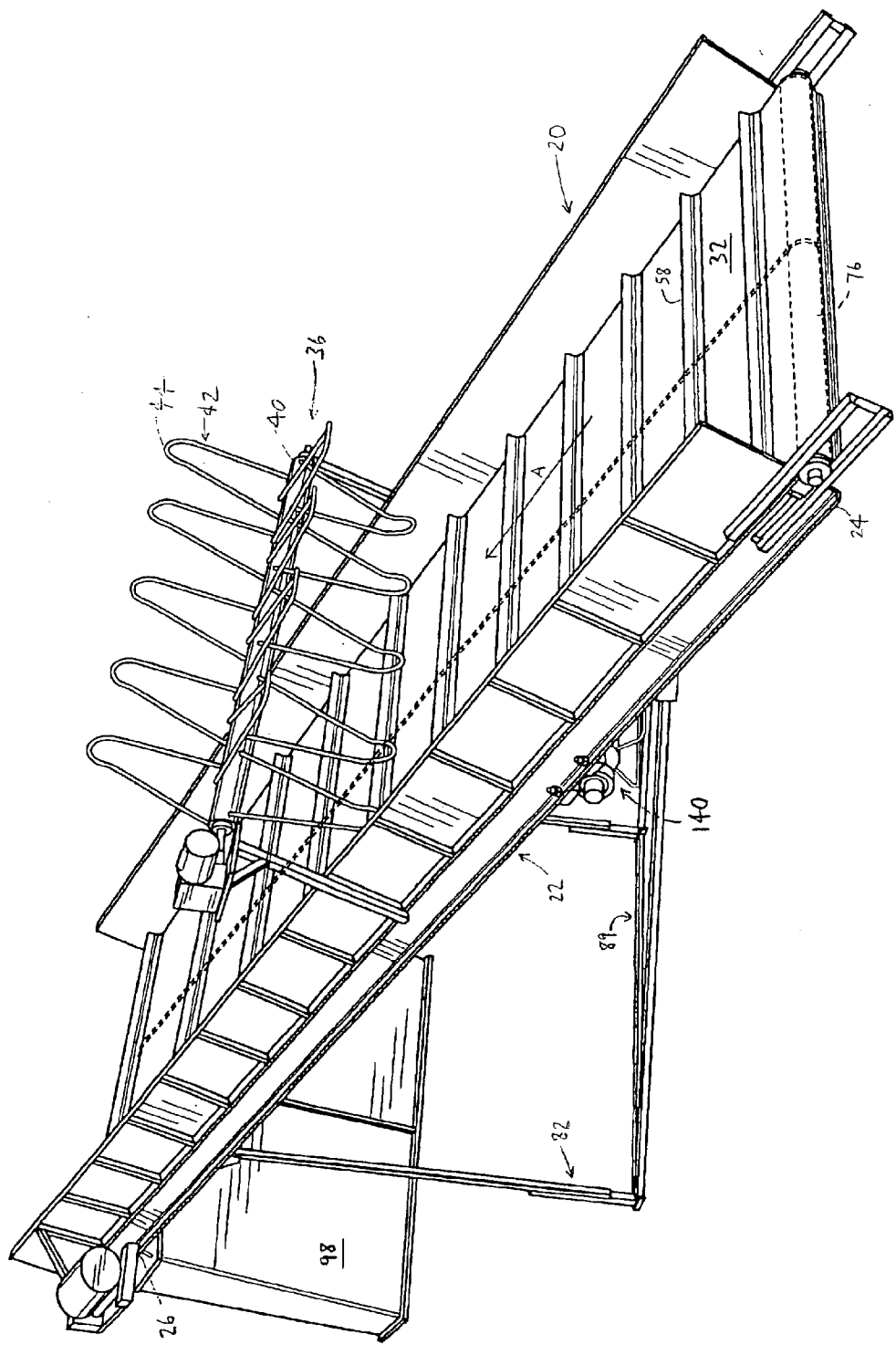
FIG. 1 is an isometric view of a preferred embodiment of the elevator showing an endless conveyor positioned on an inclined frame and a declumper attached to the frame and positioned above the conveyor.
Figure 2:
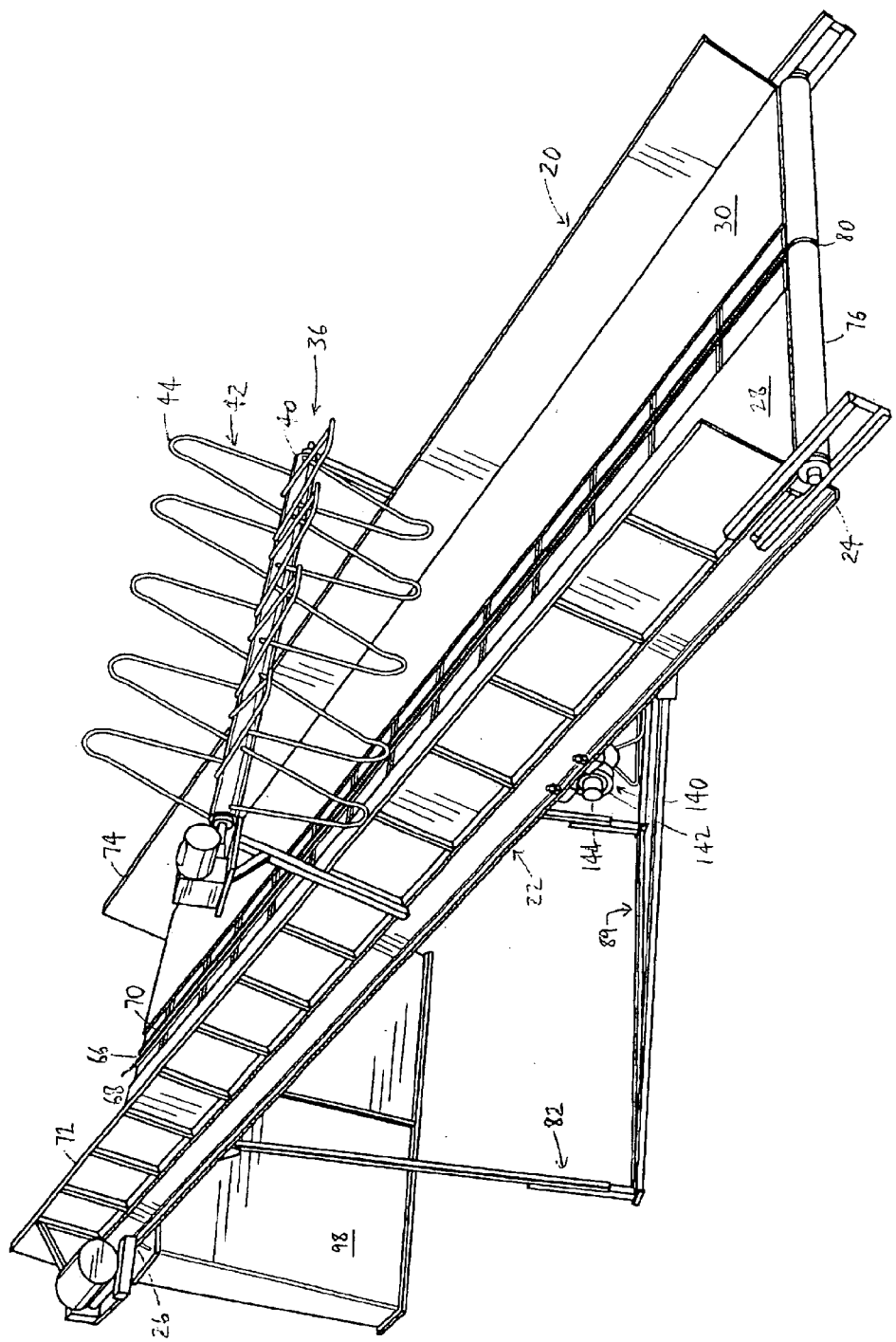
FIG. 2 is an isometric view of the elevator of FIG. 1 showing the inclined frame without the endless conveyor positioned thereon, and showing deck portions extending from a lower end of the frame to an upper end.
Figure 5:
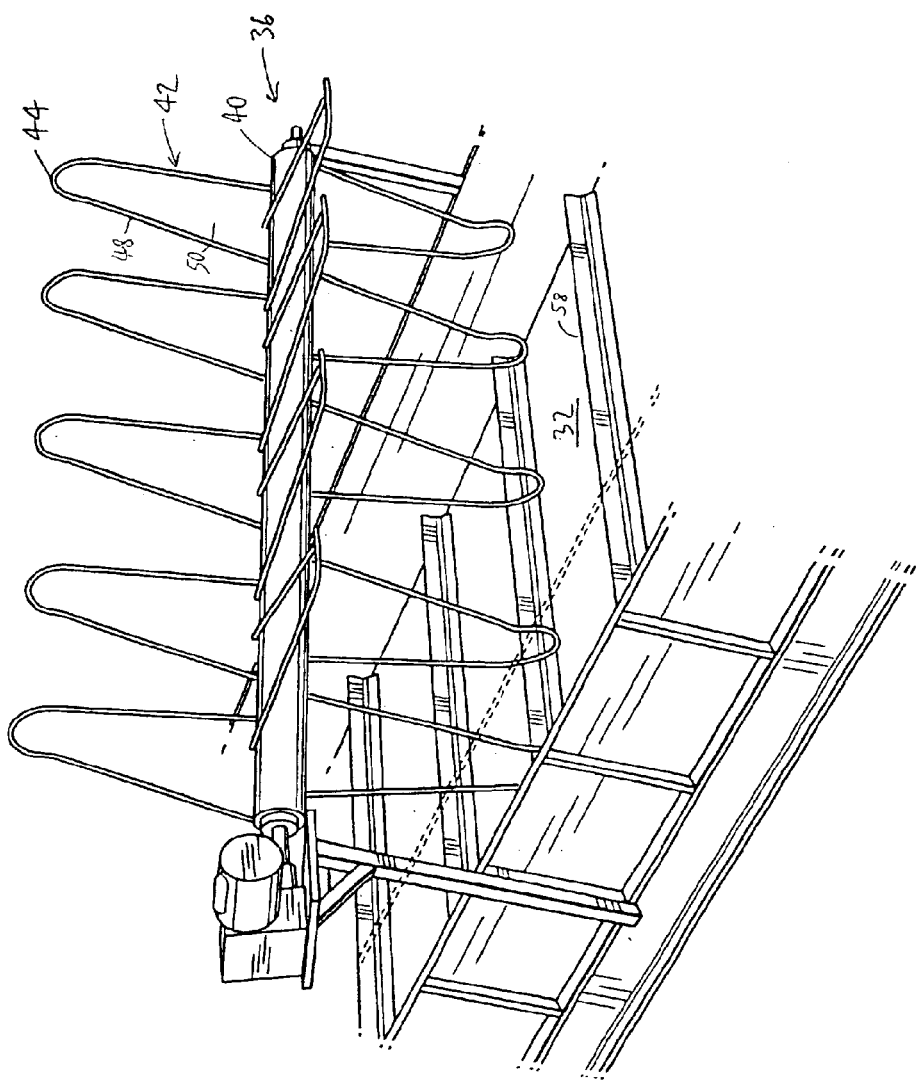
FIG. 5 is an isometric view of the declumper, drawn at a larger scale and showing nose elements projecting radially outwardly from a declumper axle.
Figure 6:
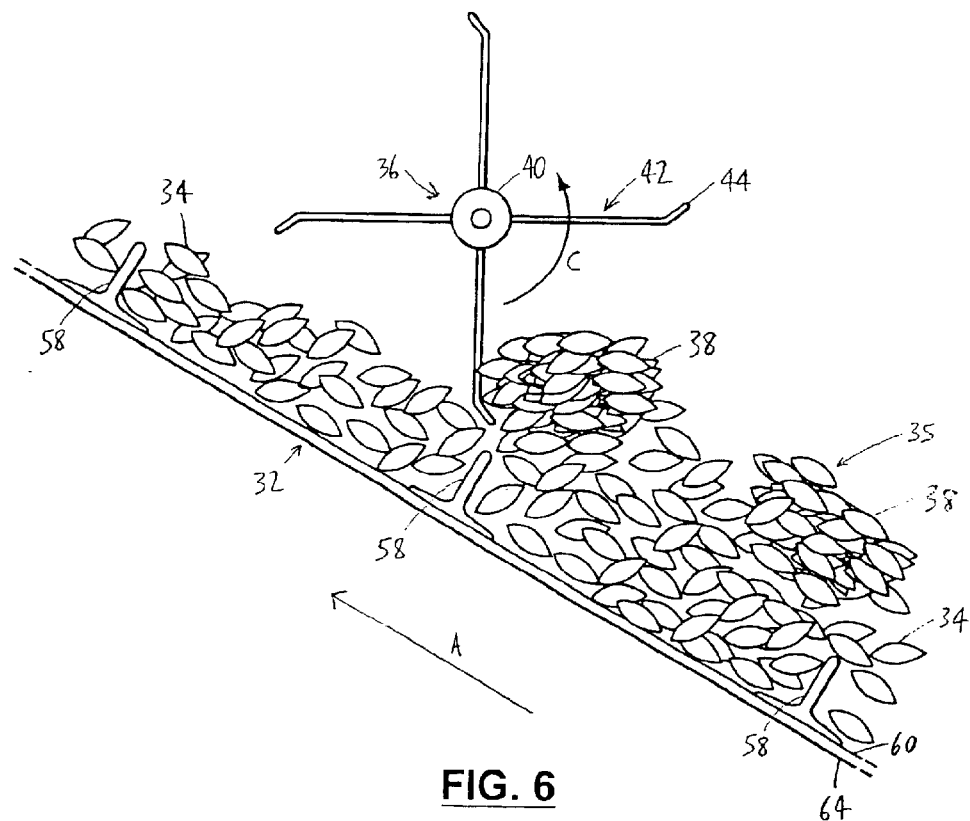
FIG. 6 is a side view showing the relative positioning of the rotating declumper and the conveyor and tobacco leaves, drawn at a smaller scale.

Reference is first made to FIGS. 1–4 to describe a preferred embodiment of an elevator indicated generally by the numeral 20 in accordance with the invention. The elevator 20 includes an inclined frame 22 longitudinally extending between a lower end 24 and an upper end 26. As can be seen in FIG. 2, the frame 22 carries deck portions 28, 30 extending substantially between the lower end 24 and the upper end 26. The elevator 20 also includes an endless conveyor 32 adapted to travel over the deck portions 28, 30 in an upward direction, in the direction shown by arrow A in FIG. 1, and under the deck portions 28, 30 in a downward direction shown by arrow B in FIG. 3. As will be described in more detail, the conveyor 32 is adapted to carry whole freshly-harvested tobacco leaves 34 comprising a load 35 to the upper end 26 and discharge the tobacco leaves 34 from the upper end 26. Also, the elevator 20 includes a declumper 36 attached to the frame 22 and positioned above the conveyor 32. The declumper 36 is adapted to buffet clumps 38 (FIG. 6) of tobacco leaves 34 to separate whole tobacco leaves 34 in the clumps 38 from each other. As also shown in FIGS. 5 and 6, the declumper 36 includes a declumper axle 40 positioned transversely to the conveyor 32 and nose elements 42 projecting radially outwardly from the declumper axle 40. The nose elements 42 include blunt ends 44 distal to the declumper axle 40 and adapted to push the tobacco leaves 34 apart without puncturing the tobacco leaves 34.

Figure 4:
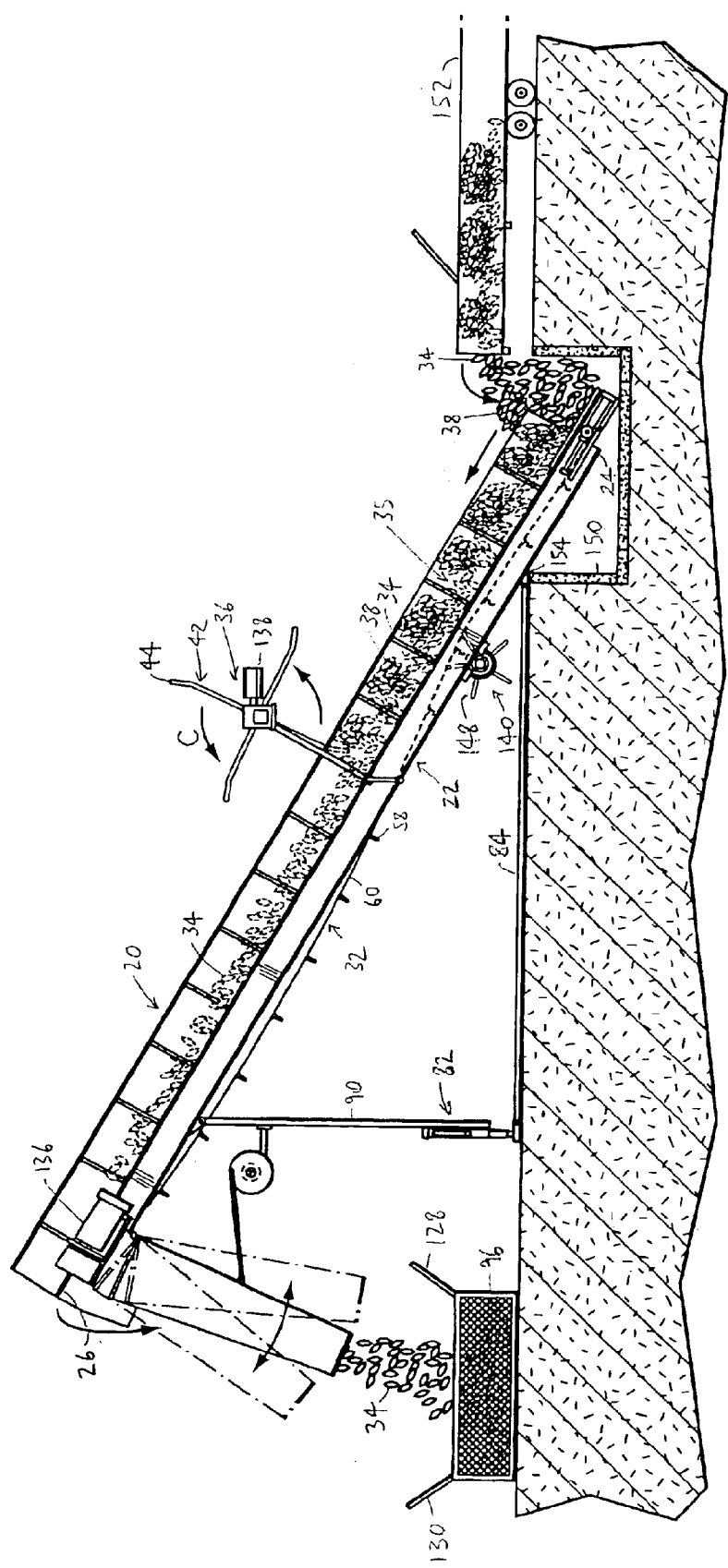
FIG. 4 is a side view of the elevator showing a load of whole freshly-harvested tobacco leaves being elevated to the upper end of the frame by the conveyor and discharged from the upper end into the tobacco curing bin.

As can be seen in FIGS. 4 and 6, the declumper axle 40 is rotated in a direction indicated by arrow C so that each end 44 of each nose element 42 moves in a direction opposite to the upward direction of travel indicated by arrow A of the conveyor 32 when the end 44 is adjacent to the conveyor 32. As shown in FIGS. 4 and 6, the declumper axle 40 is rotated in a counterclockwise direction. Due to this, the end 44 directly collides with clumps 38 of tobacco leaves 34 as the clumps 38 are carried in the upward direction by the conveyor 32.

Figure 6A:
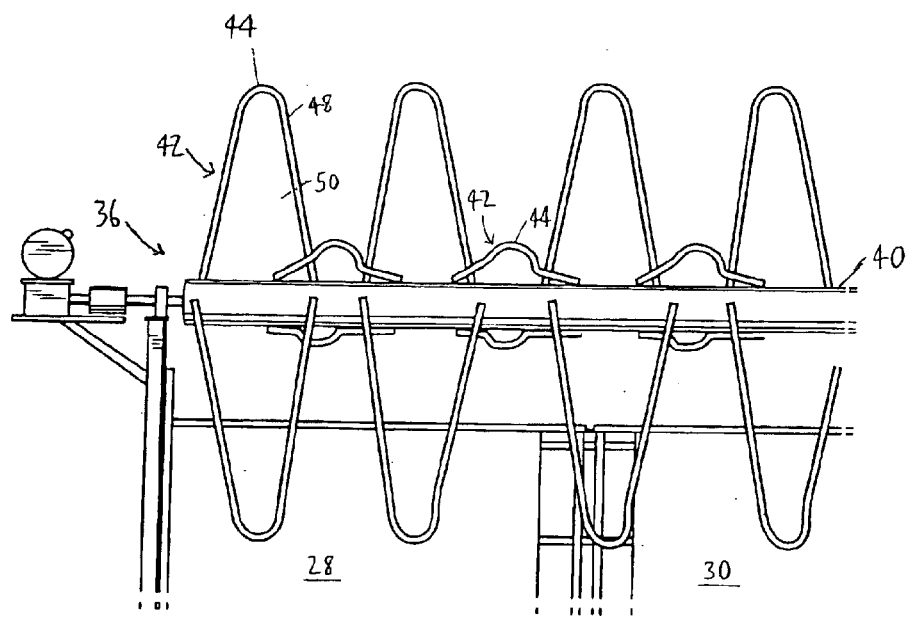
FIG. 6A is a front view of the declumper and the nose elements, drawn at a larger scale.

FIG. 6A shows that each nose element 42 is twisted substantially transversely to the conveyor 32. It can be seen in FIG. 6A that each nose element 42 is twisted in substantially a same direction. As will be described, the twisting of the nose elements 42 in this way separates the tobacco leaves 34 comprising the clumps 38 from each other.

As shown in FIGS. 5 and 6A, each nose element 42 is formed by a rod 48 forming a loop projecting from the declumper axle 40 to define an aperture 50 within the loop. The aperture 50 is at least sufficiently large to permit a single tobacco leaf 34 to pass through the aperture 50.

The frame 22 preferably comprises two side elements 52, 54 extending from the lower end 24 to the upper end 26. A series of transverse members 56 (shown in FIG. 3) are attached to the side elements 52, 54 and space the side elements 52, 54 from each other. The transverse members 56 also provide support to the deck portions 28, 30.

Preferably, and as shown in FIGS. 1, 5 and 6, the conveyor 32 includes a plurality of cleats 58 projecting from an outside surface 60 of the conveyor 32, for engaging the load 35 as the load 35 is carried by the conveyor 32 to the upper end 26 of the frame 22.

Figure 3:
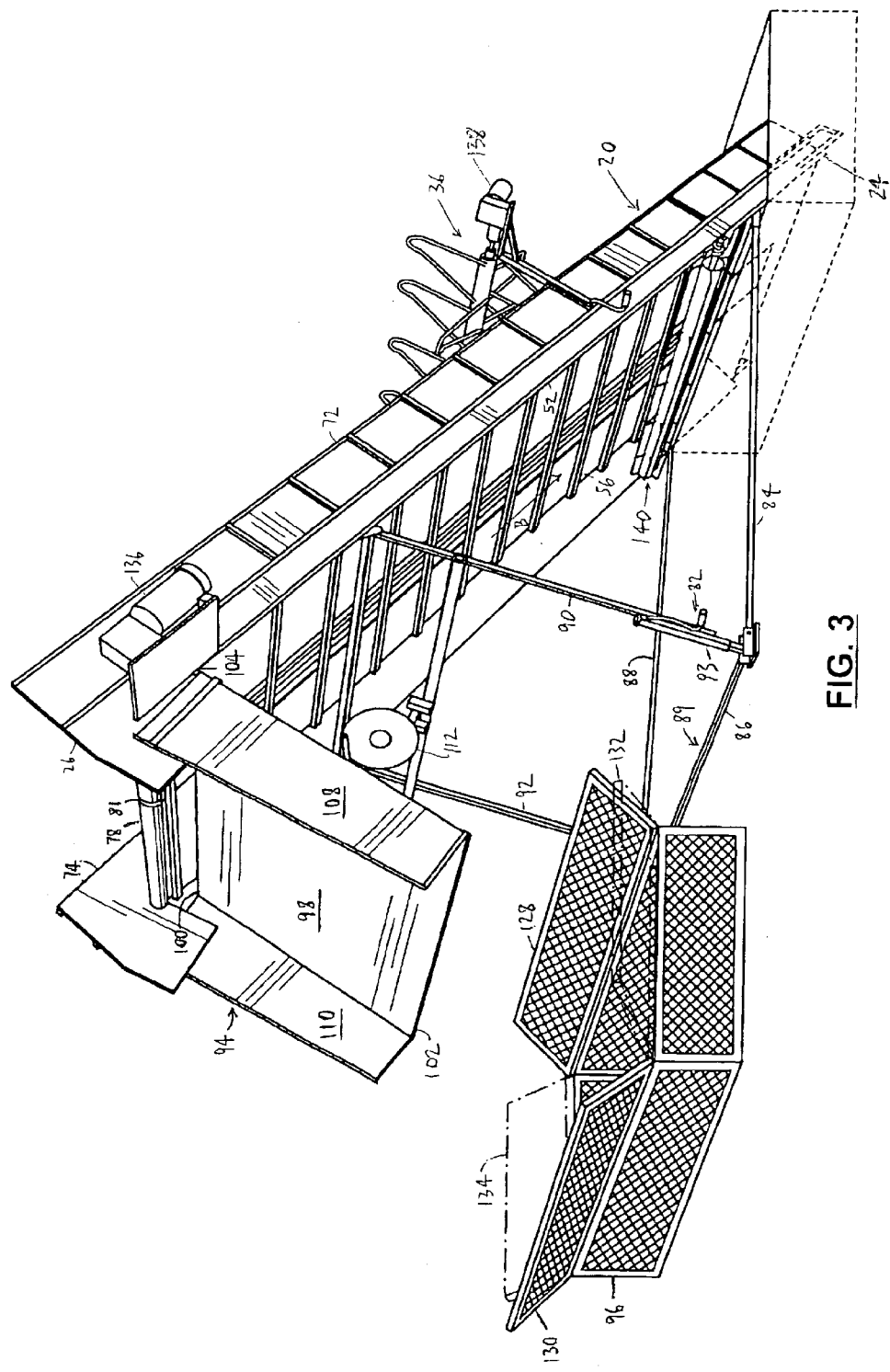
FIG. 3 is an isometric view of the elevator of FIG. 2 showing a distribution mechanism coupled to the frame at the upper end and a tobacco curing bin positioned substantially underneath the upper end.

As will be described, the conveyor 32 includes a ridge 62 (shown in FIG. 7B) positioned on an inside surface 64 opposite to the outside surface 60. Preferably, the ridge 62 extends substantially along the length of the conveyor 32. The frame 22 also includes a channel 66 extending from the lower end 24 to the upper end 26, for receiving the ridge 62 and locating the conveyor 32 relative to the frame 22. As can be seen in FIGS. 3 and 7, in the preferred embodiment, the channel 66 is defined by parallel elongate members 68, 70 supported by the transverse members 56, the elongate members 68, 70 extending substantially from the lower end 24 to the upper end 26. The ridge 62 can be, for example, a "BV" size belt glued or otherwise secured to the inside surface 64.

Preferably, the conveyor 32 has a predetermined width which has been selected to maximize separation of the tobacco leaves 34 from each other on a conveyor 32. As will be described, in the preferred embodiment, the predetermined width of the conveyor 32 is approximately nine and one-half feet. The conveyor 32 is supported by the deck portions 28, 30 which are positioned on opposite sides of the channel 66. The support provided by the deck portions 28, 30 enables the conveyor 32 to carry the load 35 from the lower end 24 to the upper end 26 without sagging significantly. It is also preferred that the elevator 20 includes opposite side walls 72, 74 extending upwardly from the side elements 52, 54 respectively and between the lower end 24 and the upper end 26 for containing the spread load 35 as the load 35 is moved in the upward direction by the conveyor 32.

As shown in FIGS. 1 and 2, the elevator preferably also includes a lower axle 76 and an upper axle 78 (FIG. 3) mounted to the frame 22 at the lower and upper ends 24, 26 thereof. The lower and upper axles 76, 78 are adapted for engagement with the conveyor 32. Preferably, each of the lower and upper axles 76, 78 includes respective grooves 80, 81 for receiving the ridge 62 and locating the conveyor 32 relative to the lower and upper axles 76, 78, as shown in FIGS. 2, 3 and 7.

Figure 10:
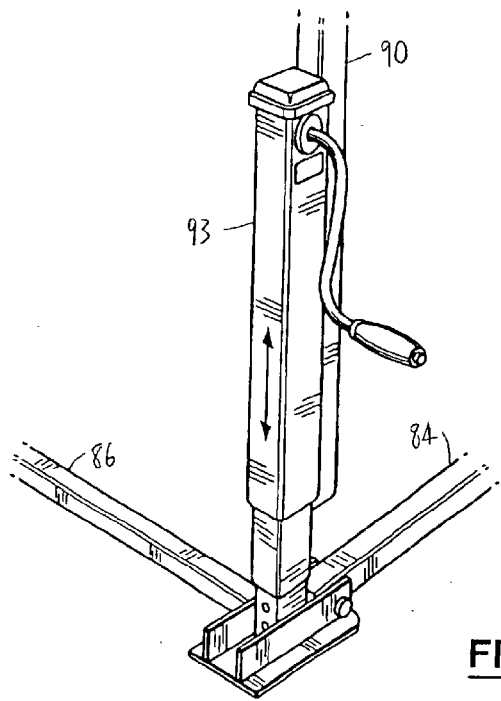
FIG. 10 (drawn adjacent to FIG. 9A) is an isometric view of a base portion of an adjustable support structure, drawn at a larger scale.

It is also preferred that the elevator 20 includes an adjustable support structure 82 for varying the inclination of the conveyor 32 in accordance with varying characteristics of the freshly-harvested tobacco leaves 34. Preferably, the adjustable support structure 82 comprises brace elements 84, 86 and 88 forming a brace 89 pivotally attached to the two side elements 52, 54 and also pivotally attached to columns 90, 92. The columns 90, 92 are positioned on each side of the brace 89 and extend upwardly to the frame side elements 52, 54 respectively, to which the columns 90, 92 are pivotally attached. As shown in FIG. 3, the height of the columns 90, 92 can be adjusted by conventional means, such as a gear assembly 93 operated manually via a crank, shown in FIG. 10.

Preferably, the elevator 20 also includes a distribution mechanism 94 for distributing the discharged tobacco leaves 34 in a tobacco curing bin 96 positioned substantially underneath the upper end 26. It is also preferred that the distribution mechanism 94 includes a main panel 98 having a top end 100 and a bottom end 102. In the preferred embodiment, the top end 100 is coupled to the frame 22 by a hinge 104 spaced a distance apart from the upper end 26. The distance is selected to permit the discharged tobacco leaves to fall a predetermined distance between the upper end 26 of the frame 22 and the main panel 98 after discharge from the upper end 26 to maximize separation of the tobacco leaves 34 from each other. In addition, the main panel 98 preferably is adapted to oscillate on the hinge 104 as shown by arrows D in FIGS. 8 and 9A relative to the frame 22 for distributing the tobacco leaves 34 uniformly in the bin 96 to optimize curing.

FIG. 3 shows that the distribution mechanism 94 also includes side panels 108, 110 extending from the top end 100 of the main panel 98 to the bottom end 102 and adapted to funnel discharged tobacco leaves 34 falling from the upper end 26 of the frame 22 to the tobacco curing bin 96.

Figure 9A:
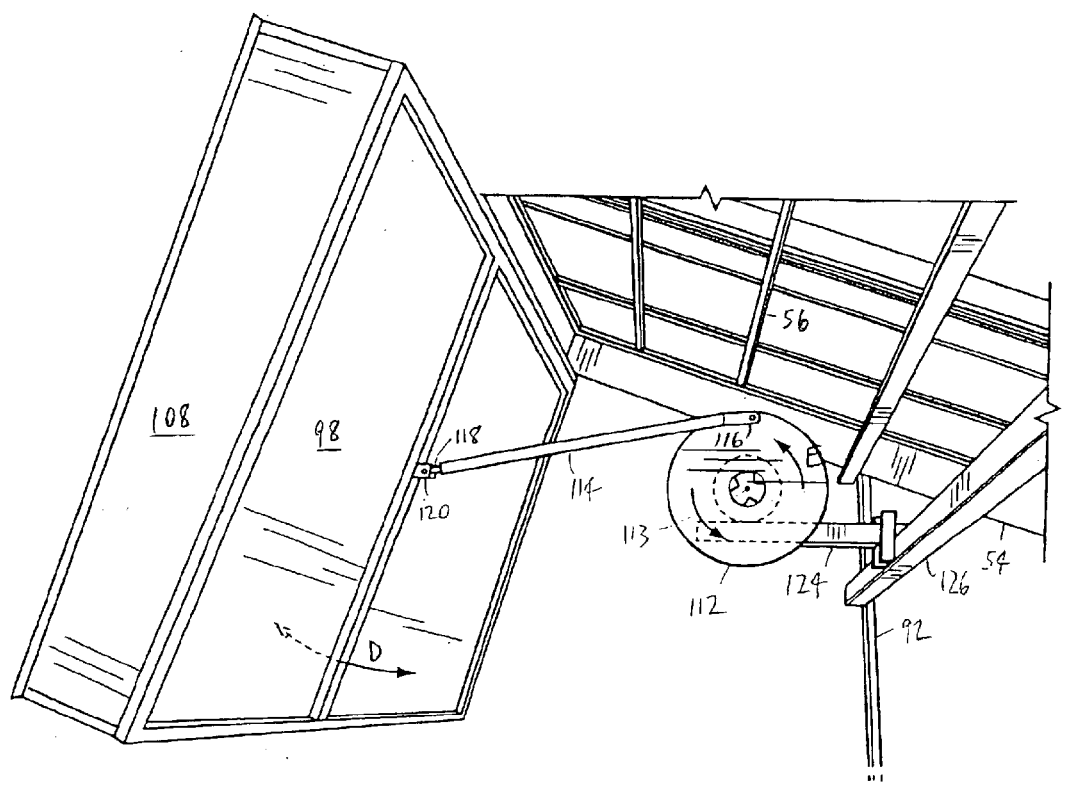
FIG. 9A is an isometric view of the distribution mechanism from one side of the elevator, drawn at a larger scale.
Figure 9B:
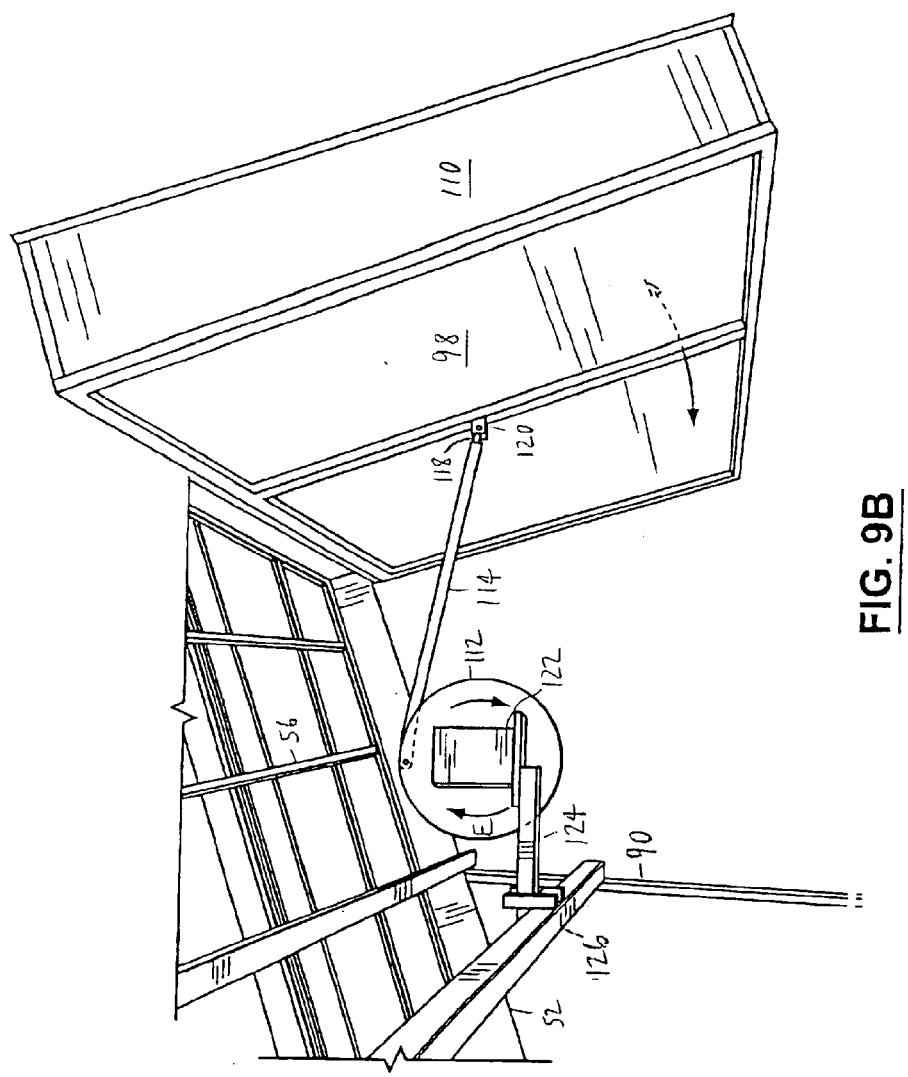
FIG. 9B is an isometric view of the distribution mechanism from another side of the elevator.

FIGS. 9A and 9B show a disc 112 rotatable about an axis 113 in the direction indicated by arrow E and a rod 114 having a proximal end 116 pivotally attached to the disc 112 at a distance radially outward from the axis 113, so that the disc 112 and the rod 114 form an eccentric cam. The rod 114 also has a distal end 118 pivotally attached to the main panel 98 at a receptacle 120 provided on the main panel 98 for that purpose. As can be seen in FIG. 9B, a motor 122 is provided for rotating the disc 112. The motor 122 is supported by an arm 124 projecting from a beam 126 extending between the columns 90, 92. The beam 126 provides additional strength to the adjustable support structure 82. Rotation of the disc 112 causes eccentric motion of the rod 114, resulting in oscillation of the main panel 98 on the hinge 104 relative to the frame 22. The oscillation of the main panel 98 causes the main panel 98 to distribute the leaves 34 back and forth across in the bin 96.

Figure 11:
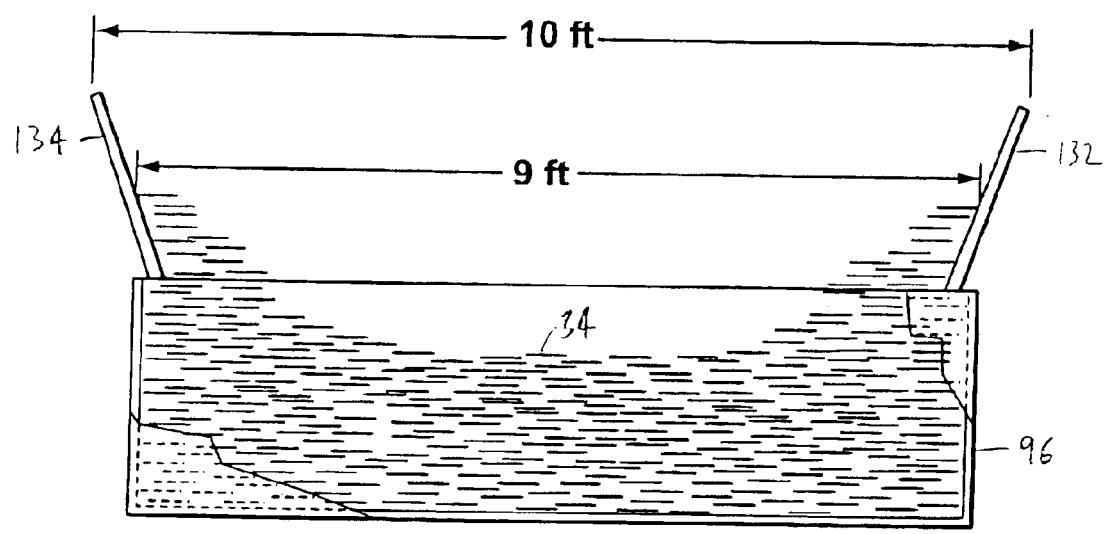
FIG. 11 is an end view of the tobacco curing bin showing tobacco leaves uniformly distributed therein, drawn at a smaller scale.

As can be seen in FIG. 3, the tobacco curing bin 96 has doors 128, 130 which, when opened, can also assist to direct tobacco leaves 34 into the curing bin 96. It has been found to be expedient to add temporary panels 132, 134 as well, to assist further in directing leaves into the tobacco curing bin 96. As shown in FIG. 11, the typical tobacco curing bin is approximately 9 feet wide. The temporary panels 132, 134 are preferably positioned in the bin 96 so that the distance between the upper ends of the temporary panels 132, 134 is approximately 10 feet. Because the conveyor 32 is nine and one-half feet wide, the leaves 34 can spread out further after discharge, as they are directed into the bin 96.

It is also preferred that the conveyor 32, the declumper 36, and the distribution mechanism 94 are all powered by electric motors 136, 138, and 122 respectively. This is preferred because of the possibility of damage to tobacco leaves 34 if other means of powering these elements are used. For example, if hydraulic fluid is used, such fluid could leak onto the leaves and destroy the value of at least a portion of the load 35. It is also preferred that the electric motor 122, which provides power to the distribution mechanism 94, is a dc electric motor adapted to be operated at variable speeds.

In the preferred embodiment, the elevator 20 includes a roller 140 positioned underneath the conveyor 32 for supporting the conveyor 32 as the conveyor 32 travels in the downward direction. As will be discussed, due to the support provided by the roller 140, the wear to which the conveyor 32 is subjected is minimized. The roller 140 includes bushings 142 in which a roller axle 144 rotates in the direction indicated by arrow F in FIG. 12A. In addition, and as can be seen in FIG. 12, the roller 140 includes an elongate roller body 146 coaxial with the roller axle 144. FIG. 12 also shows that the length of the roller body 146 extends across the width of the conveyor 32. The roller 140 also includes a number of ridges 148 projecting radially from the roller body 146 and extending substantially along the length of the roller body 146. As shown in FIG. 12A, the ridges 148 are spaced from each other about the roller body 146 so that the ridges 148 (rather than the roller body 146) engage the outer surface 60 of the conveyor 32. Preferably, the ridges 148 project a distance radially outward from the roller body 146 sufficient that the cleats 58 do not contact the roller body 146 and the roller 140 cooperates with the conveyor 32 so that the cleats 58 are received between the ridges 148, as can best be seen in FIG. 12A. The roller body 146 rotates with the roller axle 144 in the direction indicated by arrow F in FIG. 12A when the conveyor 32 moves in the direction of arrow B (i.e., in the downward direction) due to friction between the outer surface 60 and the ridges 148.

In use, and as shown in FIG. 4, the whole freshly-harvested tobacco leaves 34 are dumped onto the conveyor 32 at the lower end 24. Preferably, the lower end 24 is positioned in a pit 150, so that the leaves 34 fall a somewhat larger vertical distance than would otherwise be the case when the leaves 34 are dumped onto the conveyor 32 from a box 152 forming part of a trailer or vehicle in which the leaves 34 have been brought from the harvesting machine (not shown). For example, a trailer box such as that described in U.S. patent application Ser. No. 10/189,903 (which patent application is incorporated herein by reference) could be used to bring the whole freshly-harvested tobacco leaves 34 from the harvesting machine to the elevator 20. The leaves 34, including clumps 38, are carried in an upward direction by the conveyor 32. The clumps 38 collide with the ends 44 of the nose elements 42 of the declumper 36, and the tobacco leaves 34 comprising the clumps 38 are separated from each other. In practice, where the load 35 includes a number of clumps 38, some clumps 38 require repeated buffeting by the ends 44 before the leaves 34 comprising the clumps 38 are separated from each other and able to pass by the declumper 36.

As noted above, each nose element 42 is twisted substantially transversely to the conveyor 32. This twisting has been found to be desirable because the buffeting to which the clumps 38 are subjected by the declumper 36 tends to be more effective as a result. Because of the twisting of the nose elements 42 in a same direction generally transverse to the conveyor 32, clumps 38 can be buffeted several times by the ends 44. Also, leaves 34 which are lifted by the end 44 can fall through the aperture 50 back to the conveyor 32, to continue being carried by the conveyor 32 in an upward direction to the upper end 26. The position of the declumper axle 40 relative to the conveyor 32, and consequently the position of the ends 44 of the nose elements 42 relative to the conveyor 32, can be adjusted when conditions of the load 35 warrant.

The ends 44 are blunt because the tobacco leaves 34 are to be substantially whole and undamaged when they are placed in the bin 96. Therefore, the ends 44 should not have sharp edges which might cause punctures or tears in the leaves 34. Also, because of the need to avoid damaging the tobacco leaves 34, the declumper 36 is intended to buffet the clumps 38 with a series of repeated blows which are sufficiently soft as to be unlikely to damage the leaves 34. The declumper axle 40 is preferably rotated at a relatively slow speed in order to accomplish separation of the leaves 34 which are in the clumps 38 from each other with minimal damage to the leaves 34.

In one embodiment, the width of the conveyor 32 is approximately nine and one-half feet. This relatively large conveyor width is desirable because the tobacco leaves 34 can become more spread out and are therefore more likely to separate from each other when they are dumped onto the conveyor 32 than would be the case if the conveyor 32 were narrower. In addition, the conveyor 32 includes cleats 58 approximately 3 inches high which engage the load 35, facilitating movement of the load 35 by the conveyor 32. The outside surface 60 preferably is a rough surface. Also, the ridge 62 maintains the relatively wide conveyor 32 in position relative to the frame 22 and the lower and upper axles 76, 78 because the ridge 62 is received in the channel 66 and in the groove 80. It will be appreciated by those skilled in the art that a relatively wide conveyor such as the conveyor 32 would otherwise be difficult to keep aligned. It will also be appreciated that because of the relatively wide width of the conveyor 32, it is desirable that the deck portions 28, 30 support the conveyor 32.

The leaves 34 are discharged at the upper end 26 of the frame, and fall a distance before at least some of the leaves 34 contact the main panel 98 of the distribution mechanism 94 as the main panel 98 oscillates, distributing the leaves 34 across the bin 96. The side panels 108, 110 also direct the leaves 34 into the tobacco curing bin 96. In addition, the opened doors 128, 130 of the bin 96 and the temporary panels 132, 134 serve to direct the leaves 34 into the bin 96.

FIG. 11 shows an idealized configuration of the leaves 34 in the bin 96. For simplicity, doors 128 and 130 are not shown in FIG. 11. Preferably, the top of the leaves 34 accumulated in the bin 96 forms a "smile" configuration once the bin 96 has been loaded, as shown in FIG. 11. This is because the leaves 34 tend to shrink somewhat as they are cured, so that voids can tend to form at the edge of the bin 96 as bulk curing takes place. Positioning relatively more leaves at the inside edges of the bin 96 assists in overcoming this tendency. After the bin 96 is fully loaded, as shown in FIG. 11, then the temporary panels 132, 134 are removed, the doors 128, 130 are closed, and the bin 96 is removed and sent to a curing barn (not shown), where the leaves 34 will be bulk cured while remaining in the bin 96. The elevator 20 is stopped while a new, empty bin 96 is moved into position underneath the upper end 26 of the frame 22.

It will be appreciated that the moisture content of the tobacco leaves 34 can vary over time. When the tobacco leaves 34 generally have a higher moisture content, the adjustable support structure 82 can be adjusted to raise the upper end 26 of the frame 22 so that the leaves 34 would fall somewhat further upon discharge into the bin 96. Also, the speed of oscillation may be changed, for example, via conventional speed control on motor 122.

Figure 8:
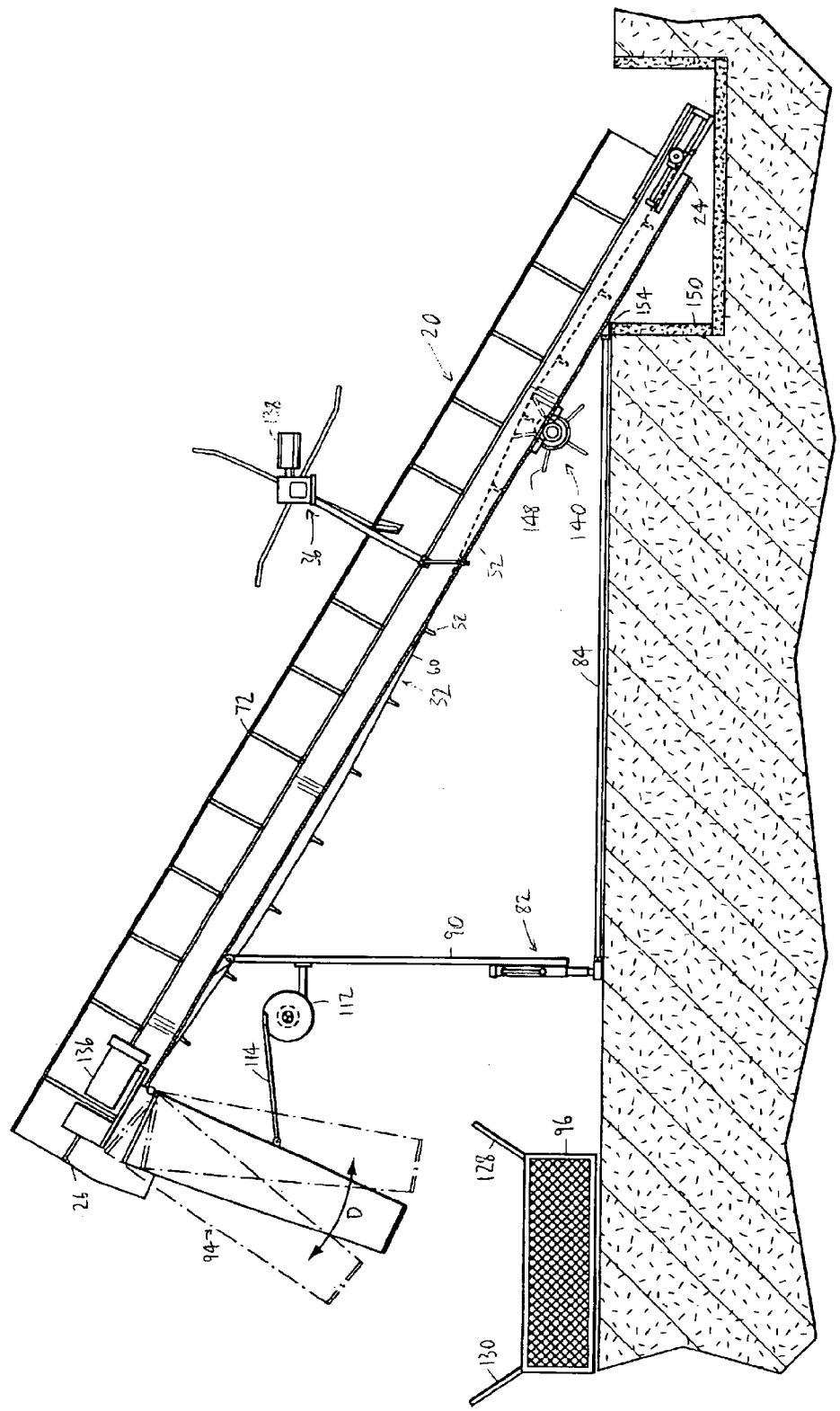
FIG. 8 is a side view of the elevator, drawn at a smaller scale.

As can be seen in FIGS. 4 and 8, the portion of the conveyor 32 which is underneath the deck portions 28, 30 tends to sag downwardly. This is because the conveyor 32 is best operated in practice at a tension which permits the conveyor 32 to sag to a certain extent when the conveyor 32 travels in the downward direction, as shown in FIGS. 4 and 8. It can be seen in FIGS. 4 and 8 that, when the lower end 24 of the frame 22 is positioned in the pit 150, the conveyor 32 would strike an edge 154 of the pit 150 but for the roller 140. The roller 140 supports the conveyor 32 so that the conveyor 32 does not drag over the edge 154 of the pit 150, and wear of the conveyor 32 is thereby minimized.

It will be evident to those skilled in the art that the invention can take many forms, and that such forms are within the scope of the invention as claimed. Therefore, the spirit and scope of the appended claims should not be limited to the description of the preferred versions contained herein.

I claim:

1. An elevator for separating and distributing a plurality of whole freshly harvested tobacco leaves comprising a load, at least a portion of the load comprising a plurality of clumps of agglomerated tobacco leaves, the elevator having:

an inclined frame longitudinally extending between a lower end and an upper end;

the frame carrying at least one deck portion extending substantially between the lower end and the upper end;

an endless conveyor adapted to travel over said at least one deck portion in an upward direction and under said at least one deck portion in a downward direction, the endless conveyor being adapted to carry the tobacco leaves to the upper end and discharge the tobacco leaves from the upper end; and a declumper attached to the frame and positioned above the conveyor, the declumper being adapted to buffet the clumps of tobacco leaves to separate the whole tobacco leaves in the clumps from each other, the declumper including a rotatable declumper axle positioned transversely to the conveyor and at least one nose element projecting radially outwardly from the declumper axle, said at least one nose element including a blunt end distal to the declumper axle and adapted to push the tobacco leaves apart without puncturing the tobacco leaves, whereby the conveyor is adapted to elevate the load to the upper end so that the elevated load may fall from the upper end and the tobacco leaves may separate from each other.

2. An elevator according to claim 1 in which the declumper axle is rotated such that the end of said at least one nose element moves in a direction opposite to the upward direction when the end is adjacent to the conveyor to collide with clumps of tobacco leaves as the clumps are carried in the upward direction by the conveyor.

3. An elevator according to claim 1 in which the declumper includes a plurality of nose elements and each said nose element is twisted substantially transversely to the conveyor, each said nose element being twisted in substantially a same direction, for separating the tobacco leaves comprising said clumps.

4. An elevator according to claim 1 in which said at least one nose element comprises a rod forming a loop projecting from the declumper axle to define an aperture inside the loop, the aperture being sufficiently large to permit a tobacco leaf to pass through the aperture.

5. An elevator according to claim 1 in which the conveyor includes a plurality of cleats projecting from an outer surface of the conveyor, for engaging the load as the load is carried to the upper end of the frame.

6. An elevator according to claim 1 in which the conveyor includes a ridge positioned on an inside surface opposite to an outer surface which engages the load and extending substantially along the conveyor, and the frame additionally includes a channel extending from the lower end to the upper end, for receiving the ridge and locating the conveyor relative to the frame.

7. An elevator according to claim 6 in which the conveyor has a predetermined width selected to maximize separation of the tobacco leaves from each other on the conveyor, the conveyor being supported by two deck portions positioned on opposite sides of the channel.

8. An elevator according to claim 1 additionally including opposite side walls extending upwardly from the frame and between the lower end and the upper end for containing the spread load as the load is moved in the upward direction by the conveyor.

9. An elevator according to claim 6 in which the elevator includes a lower axle and an upper axle mounted to the frame at the lower and upper ends thereof, the lower and upper axles being adapted for engagement with the conveyor, and in which each of the lower and upper axles includes a groove for receiving the ridge and locating the conveyor relative to the lower and upper axles.

10. An elevator according to claim 5 additionally including a roller positioned underneath the conveyor for supporting the conveyor as the conveyor travels in the downward direction.

11. An elevator according to claim 10 in which the roller includes a roller body having a length extending across a width of the conveyor and the roller has a plurality of ridges projecting radially from the roller body and positioned substantially along the length of the roller body for engaging the outer surface of the conveyor such that the cleats are receivable between the ridges.

12. An elevator according to claim 1 additionally including an adjustable support structure for varying the inclination of the conveyor in accordance with varying characteristics of the freshly harvested tobacco leaves.

13. An elevator for separating and distributing a plurality of whole freshly harvested tobacco leaves comprising a load, at least a portion of the load comprising a plurality of clumps of agglomerated tobacco leaves, the elevator having:
  an inclined frame longitudinally extending between a lower end and an upper end;
  an endless conveyor adapted to travel over said at least one deck portion in an upward direction and under said at least one deck portion in a downward direction;
  a declumper attached to the frame and positioned above the conveyor, the declumper being adapted to buffet the clumps of tobacco leaves to separate the whole tobacco leaves in the clumps from each other, the declumper including a rotatable declumper axle positioned transversely to the conveyor and at least one nose element projecting radially outwardly from the declumper axle, said at least one nose element including a blunt end distal to the declumper axle and adapted to push the tobacco leaves apart without puncturing the tobacco leaves; and
  a distribution mechanism for distributing the discharged tobacco leaves in a tobacco curing bin positioned substantially underneath the upper end of the frame, the distribution mechanism including a main panel having a top end and a bottom end, the top end of the main panel being coupled to the frame by at least one hinge spaced a distance from the upper end of the frame selected to permit the discharged tobacco leaves to fall a predetermined distance to maximize separation of the tobacco leaves from each other, the main panel being adapted to oscillate on said at least one hinge relative to the frame for distributing the tobacco leaves uniformly in the bin to optimize curing,
whereby the tobacco leaves discharged from the upper end of the frame are distributed evenly across the bin.

14. An elevator according to claim 13 which the declumper axle is rotated such that the end of said at least one nose element moves in a direction opposite to the upward direction when the end is adjacent to the conveyor to collide with clumps of tobacco leaves as the clumps are carried in the upward direction by the conveyor and in which the declumper includes a plurality of nose elements and each said nose element is twisted substantially transversely to the conveyor, each said nose element being twisted in substantially a same direction for separating the tobacco leaves comprising said clumps, said at least one nose element comprising a rod forming a loop projecting from the declumper axle to define an aperture inside the loop, the aperture being sufficiently large to permit a tobacco leaf to pass through the aperture.

15. An elevator according to claim 13 additionally including a roller positioned underneath the conveyor for supporting the conveyor as the conveyor travels in the downward direction.

16. An elevator according to claim 13 additionally including an adjustable support structure for varying the inclination of the conveyor in accordance with varying characteristics of the freshly harvested tobacco leaves.

* * * * *